US012783691B2

(12) United States Patent
Dahmen et al.

(10) Patent No.: US 12,783,691 B2
(45) Date of Patent: Nov. 3, 2026

(54) IDENTIFICATION OF A RESOURCE ATTACK PATH BY CONNECTING CODE, CONFIGURATION, AND TELEMETRY

(71) Applicant: Microsoft Technology Licensing, LLC, Redmond, WA (US)

(72) Inventors: Karen Lowe Dahmen, Sammamish, WA (US); George Wilburn, Austin, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 19/094,315

(22) Filed: Mar. 28, 2025

(65) Prior Publication Data

US 2025/0225255 A1 Jul. 10, 2025

Related U.S. Application Data

(63) Continuation of application No. 17/818,801, filed on Aug. 10, 2022, now Pat. No. 12,361,136.

(51) Int. Cl.
*G06F 21/57* (2013.01)
*G06F 21/56* (2013.01)
(Continued)

(52) U.S. Cl.
CPC .......... *G06F 21/577* (2013.01); *G06F 21/566* (2013.01); *G06F 21/568* (2013.01);
(Continued)

(58) Field of Classification Search
None
See application file for complete search history.

(56) References Cited

U.S. PATENT DOCUMENTS

2021/0099478 A1* 4/2021 Seetharamaiah ... H04L 63/1433
2021/0400071 A1* 12/2021 Ray .................... G06F 21/6245
(Continued)

FOREIGN PATENT DOCUMENTS

CA 2935463 C * 3/2017 ......... H04L 63/0209
EP 3528162 B1 * 6/2020 ........... G06F 21/552
WO WO-2020061755 A1 * 4/2020 ............ H04W 28/16

*Primary Examiner* — Ali H. Cheema

(74) *Attorney, Agent, or Firm* — Ray Quinney & Nebeker P.C.; Tiffany B. Healy

(57) ABSTRACT

Computing resources deployed on the cloud can be susceptible to different types of malicious attacks based on vulnerabilities introduced in computer program instructions that define the computing resources. To address these types of attacks, methods, systems, apparatuses, and computer-readable storage mediums are described for identifying a resource attack path. A vulnerability identifier scans a set of computer program instructions to identify a vulnerability therein. A resource mapper generates a resource map that identifies a relationship between a portion of the set of computer program instructions and a resource executing in a cloud. An attack path identifier obtains a log that identifies telemetry events in the cloud. The attack path identifier further identifies an attack path based at least on the identified vulnerability, the resource map, and the log. A security event remediator performs a remediation action in response to the identifying the attack path.

20 Claims, 6 Drawing Sheets

(51) Int. Cl.

| | |
|---|---|
| *G06F 21/52* | (2013.01) |
| *G06F 21/55* | (2013.01) |
| *H04L 9/40* | (2022.01) |

(52) U.S. Cl.
CPC ............ *G06F 21/52* (2013.01); *G06F 21/554* (2013.01); *H04L 63/1425* (2013.01); *H04L 63/1433* (2013.01); *H04L 63/1441* (2013.01); *H04L 63/145* (2013.01); *H04L 63/1466* (2013.01); *H04L 63/205* (2013.01)

(56) References Cited

U.S. PATENT DOCUMENTS

| | | | | |
|---|---|---|---|---|
| 2022/0060507 | A1* | 2/2022 | Crabtree | G06F 16/2477 |
| 2022/0092178 | A1* | 3/2022 | Herwono | G06F 21/577 |
| 2022/0360504 | A1* | 11/2022 | Kairali | G06F 8/65 |
| 2023/0011957 | A1* | 1/2023 | Panse | H04L 63/0263 |
| 2023/0114821 | A1* | 4/2023 | Thomas | H04L 63/1408 726/23 |

* cited by examiner

IDENTIFICATION OF A RESOURCE ATTACK PATH BY CONNECTING CODE, CONFIGURATION, AND TELEMETRY

CROSS-REFERENCE TO RELATED APPLICATIONS

This application is a continuation of U.S. patent application Ser. No. 17/818,801, filed Aug. 10, 2022, entitled "Identification of a Resource Attack Path by Connecting Code, Configuration, and Telemetry," the entirety of which is incorporated by reference herein

BACKGROUND

During development of a computer program, a security vulnerability can be inadvertently introduced, such as by a developer that writes the source code that defines the operation of the computer program. While such a vulnerability is typically not introduced with a malicious intent, the computer program may nevertheless be deployed with the vulnerability if not corrected, which can result in a compromise of the computer program or even other systems coupled to the computer program.

In instances where a computer program with a vulnerability is deployed, anomalous activities associated with the computer program can be identified in various ways, such as by identifying simultaneous logins from different geographic regions, failed login attempts, efforts to access sensitive data, etc. Such techniques typically require constant analysis of various logs associated with a resource, which consumes significant processing resources and still results in a poor overall time to detection of malicious activities. In addition, such techniques are performed independent of vulnerabilities present in the underlying source code of a computer program, which results in a further degradation of performance with respect to both resource utilization and detection capabilities.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums are described for identifying a resource attack path. A vulnerability identifier scans a set of computer program instructions to identify a vulnerability therein. A resource mapper generates a resource map that identifies a relationship between a portion of the set of computer program instructions and a resource executing in a cloud. An attack path identifier obtains a log that identifies telemetry events in the cloud. The attack path identifier further identifies an attack path based at least on the identified vulnerability, the resource map, and the log. A security event remediator performs a remediation action in response to the identifying the attack path.

Further features and advantages of embodiments, as well as the structure and operation of various embodiments, are described in detail below with reference to the accompanying drawings. It is noted that the methods and systems are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
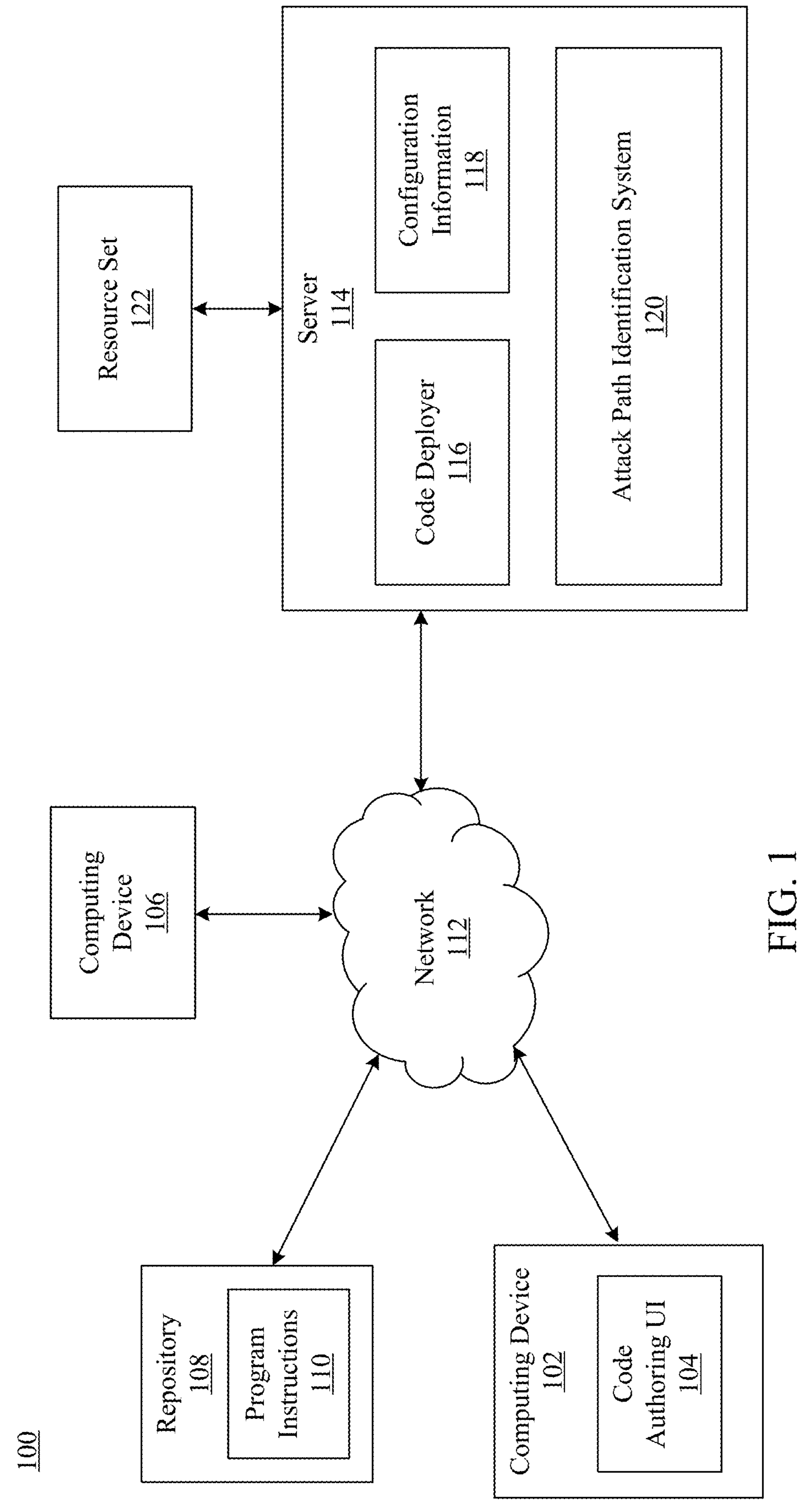
FIG. 1 shows a block diagram of a system for identifying an attack path, in accordance with an example embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on." If the performance of an operation is described herein as being "in response to" one or more factors, it is to be understood that the one or more factors may be regarded as a sole contributing factor for causing the operation to occur or a contributing factor along with one or more additional factors for causing the operation to occur, and that the operation may occur at any time upon or after establishment of the one or more factors.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

During development of a computer program, a security vulnerability can be inadvertently introduced, such as by a developer that writes the source code that defines the operation of the computer program. While such a vulnerability is typically not introduced with a malicious intent, the computer program may nevertheless be deployed with the vulnerability if not corrected, which can result in a compromise of the computer program or even other systems coupled to the computer program.

In instances where a computer program with a vulnerability is deployed, anomalous activities associated with the computer program can be identified in various ways, such as by identifying simultaneous logins from different geographic regions, failed login attempts, efforts to access sensitive data, etc. Such techniques typically require constant analysis of various logs associated with a resource, which consumes significant processing resources and still results in a poor overall time to detection of malicious activities. In addition, such techniques are performed independent of vulnerabilities present in the underlying source code of a computer program, which results in a further degradation of performance with respect to both resource utilization and detection capabilities.

Techniques described herein address these and other issues by providing methods, systems, apparatuses, and computer-readable storage mediums for identifying a resource attack path. In an example system, a vulnerability identifier scans a set of computer program instructions to identify a vulnerability therein. A resource mapper generates a resource map that identifies a relationship between a portion of the set of computer program instructions and a resource executing in a cloud. An attack path identifier obtains a log that identifies telemetry events in the cloud. The attack path identifier further identifies an attack path based at least on the identified vulnerability, the resource map, and the log. A security event remediator performs a remediation action in response to the identifying the attack path.

Identifying an attack path as described herein has numerous advantages, including but not limited to reducing the consumption of processing and storage resources. For example, techniques described herein involve identification of potential vulnerabilities with respect to code, and mapping that code (including any associated vulnerabilities) to resources present in the cloud. In this manner, rather than expending resources in crawling through all of the information present in access logs to identify security events, the connections that identify the relationship between the code and the runtime resources allow for a targeted analysis of telemetry information. Such an approach utilizes fewer processing cycles and reduces the amount of log information that needs to be collected, stored, and/or analyzed by a detection system. As a result, an improvement in resource utilization can be achieved in accordance with techniques described herein.

In addition to reducing the processing and storage resources of a detection system, techniques described herein further improve the security of resources stored on and/or accessible via computing devices, improve the security of the computing devices generally, and/or improve the security of a network coupled thereto. For example, by detecting attack paths in a more efficient matter, security events may be detected with a reduced mean time to detect (MTTD). This reduction in MTTD may be used to alert the relevant security professionals and/or take preventative measures (e.g., automated measures) to resolve the security event, such as by removing or modifying permissions, modifying a security policy, blocking or limiting access to a resource, or other suitable measures to resolve the security incident associated with the resource.

In addition to advantageously enabling improvements to the security of resources, the described techniques also enable improvements in the computing devices and/or network that include or provide access to such resources. For instance, by identifying security vulnerabilities in code and mapping those vulnerabilities to resources that utilize the code, malicious activities can be more easily predicted and/or identified, which can not only result in mitigation of a compromise of the resource itself, but of other resources coupled thereto in the event of a lateral attack. In this manner, exploitable vulnerabilities within an organization may be better addressed, thereby reducing the likelihood that an organization will suffer a larger compromise of its resources. Thus, techniques described herein may overall reduce the effect of attempted malicious activity occurring with respect to resources generally (which include but are not limited to storage devices, computing devices, and networking devices coupled thereto).

As such, example embodiments are described herein directed to techniques for identifying an attack path for a resource. For instance, FIG. 1 shows a block diagram of a system 100 for identifying an attack path, in accordance with an example embodiment. As shown in FIG. 1, system 100 includes a computing device 102, a computing device 106, a repository 108, a server 114, and a resource set 122. Computing device 102, computing device 106, repository 108, server 114, and/or resource set 122 may be communicatively coupled by a network 112. As shown in FIG. 1, computing device 102 includes a code authoring user interface (UI) 104. Repository 108 includes program instructions 110. Server 114 includes a code deployer 116, configuration information 118, and an attack path identification system 120. An example computing device that may incorporate the functionality of computing device 102, computing device 106, repository 108, server 114, and/or resource set 122 (or any subcomponents therein, whether or not illustrated in FIG. 1) is described below in reference to FIG. 7. It is noted that system 100 may comprise any number of devices, including those illustrated in FIG. 1 and optionally one or more further devices or components not expressly illustrated. System 100 is further described as follows.

Network 112 may include one or more of any of a local area network (LAN), a wide area network (WAN), a personal area network (PAN), a combination of communication networks, such as the Internet, and/or a virtual network. In example implementations, computing device 102, computing device 106, repository 108, server 114, and/or resource set 122 communicate via network 112. In an implementation, any one or more of computing device 102, computing device 106, repository 108, server 114, and/or resource set 122 may communicate over network 112 via one or more application programming interfaces (API) and/or according to other interfaces and/or techniques. Computing device 102, computing device 106, repository 108, server 114, and/or resource set 122 may each include at least one network interface that enables communications with each other. Examples of such a network interface, wired or wireless, include an IEEE 802.11 wireless LAN (WLAN) wireless interface, a Worldwide Interoperability for Microwave Access (Wi-MAX) interface, an Ethernet interface, a Universal Serial Bus (USB) interface, a cellular network interface, a Bluetooth™ interface, a near field communication (NFC) interface, etc. Further examples of network interfaces are described elsewhere herein.

Computing device 102 includes any number of one or more computing devices of one or more users (e.g., individual users, family users, enterprise users, governmental users, etc.) that each comprise one or more applications, operating systems, virtual machines, storage devices, etc. used to view and/or modify a set of program instructions associated with the functionality of resource set 122. Computing device 102 comprises any type of stationary or mobile computing device, including a mobile computer or mobile computing device (e.g., a Microsoft® Surface® device, a personal digital assistant (PDA), a laptop computer, a notebook computer, a tablet computer such as an Apple iPad™, a netbook, etc.), a mobile phone (e.g., a cell phone, a smart phone such as an Apple iPhone, a phone implementing the Google® Android™ operating system, a Microsoft Windows® phone, etc.), a wearable computing device (e.g., a head-mounted device including smart glasses such as Google® Glass™, Oculus Rift® by Oculus VR, LLC, etc.), or other type of stationary or mobile device. Computing device 102 is not limited to a physical machine, but may include other types of machines or nodes, such as a virtual machine. Computing device 102 may interface with other components illustrated in FIG. 1 through APIs and/or by other mechanisms.

In examples, code authoring UI 114 comprises a user interface for authoring a set of program instructions associated with a resource. In examples, the resource is one of a plurality of resources executing in the cloud, as will be described later. Code authoring UI 104 comprises any one or more UI elements, user input-fields, menus, etc. that enable a user (e.g., a programmer, developer, etc.) to view and/or modify program instructions that define the operation and/or functionality of a resource. In implementations, the set of program instructions comprises code (e.g., source code or assembly code) written in computer programming language, including but not limited to C, C++, C#, Python, Java, JavaScript. In examples, program instructions comprise a set of strings or graphical elements, that when compiled, generate an executable program. In examples, such executables comprises one or more resources executing in the cloud (e.g., resources set 122).

Repository 108 comprises a storage (e.g., a cloud-based storage) for storing information associated with the functionality of one or more resources of resource set 122. In one example, repository 108 is configured to store a set of program instructions 110 (or a plurality of sets of program instructions) that are authored via code authoring UI 104. In other examples, repository 108 is configured to store code generated from program instructions 110, such as compiled code, configuration information, or other information associated that defines the functionality of resources in resource set 122. Repository 108 comprise any type of storage unit, including but not limited to a memory or storage device (e.g., physical storage devices, local storage devices, cloud-based storages, disks, hard disk drives, solid state devices (SSDs), random access memory (RAM) devices, etc.), computing devices containing such memory or storage devices, or a collection thereof.

Although not expressly illustrated, repository 108 may also be configured to store any other information associated with, or accessed by, resource set 122, such as data that is sensitive (e.g., confidential, critical, private, secure, and/or not otherwise intended for public dissemination), including but not limited to company records, personal information, educational information, health information, professional information, organizational or company information, banking or other financial records, legal documents, biographic information such as birth certificates, driver's licenses, passports, etc. These examples are illustratively only, and repository 108 may include any other type of data (including both confidential and non-confidential information) that may be stored in any device whether locally and/or on a cloud-based storage. In an example, repository 108 stores information therein with one or more security protections, such as via password protection, encryption (e.g., public and private key encryption, symmetric keys, etc.), or any other suitable protection.

Computing device 106 includes any number of one or more computing devices of one or more users (e.g., individual users, family users, enterprise users, governmental users, etc.) that each comprise one or more applications, operating systems, virtual machines, storage devices, etc. used to access a resource of resource set 122. For instance, computing device 106 may enable a user to interact with a resource of resource set 122 and/or utilize functionalities defined therein. In some implementations, computing device 106 is authorized to access resource set 122 (e.g., based on user credentials, tokens, etc.). In other implementations, computing device 106 is not authorized to access resource set 122. For instance, computing device may be operated by an actor with a malicious intent for the purposes of gaining access to resource set 122 in an unauthorized fashion or otherwise attacking resource set 122. In examples, computing device 106 comprises any type of stationary or mobile computing device similar to computing device 102, described herein, and may interface with other components illustrated in FIG. 1 through APIs and/or by other mechanisms.

Server 114 comprises any number of computing devices such as a network-accessible server (e.g., a cloud computing server network), services, local processes, remote machines, web services, etc. for hosting, managing, and/or providing access to any one or more resources in resource set 122 (including the security thereof). Resources of resource set 122 comprise any type of software or hardware component of a computer (or a combination thereof) that is accessed or utilized by one or more entities in a computing environment. In some examples, a resource is defined by a collection of information or data that is stored in a storage device. In other examples, a resource includes one or more physical or virtual components of a computing device for processing information (e.g., a processor). In examples therefore, resources set 122 includes, but is not limited to, a computer or processor, a physical host, a virtual machine, software (e.g., software as a service (SaaS), a platform as a service (PaaS), etc.), licenses, devices (including network devices), a memory or storage (e.g., physical storage devices, local storage devices, cloud-based storages, disks, hard disk drives, solid state devices (SSDs), random access memory (RAM) devices, etc.), data stored within a storage (e.g., files, databases, etc.) or any other component or data of a computing environment that may be accessed or utilized by one or more entities.

In implementations, resources of resource set 122 include the resources for a particular organization (e.g., a company), a group or division (e.g., based on geography) of an organization, an individual, or any combination thereof. Further, in some implementations, resources of resource set 122 comprise resources belonging to a plurality of tenants (e.g., different clients or customers, such as different organizations) of a cloud services provider (or other storage provider) that provides storage resources for resource set 122 and/or manages the security thereof. In one example, resources of resource set 122 comprise resources associated with (e.g., owned by) a plurality of unrelated or independent tenants, such as resources of companies lacking any meaningful business relationship with each other.

Server 114 may comprise a group or collection of servers (e.g., computing devices) that are each accessible by a network such as the Internet (e.g., in a "cloud-based" embodiment). In example embodiments, server 114 is a computing device that is located remotely (e.g., in a different facility) from computing device 102, computing device 106, repository 108, and/or resource set 122. Server 114 may comprise any number of computing devices, and may include any type and number of other resources, including resources that facilitate communications with and between servers, storage by the servers, etc. (e.g., network switches, storage devices, networks, etc.). In an embodiment, devices of server 114 may be co-located (e.g., housed in one or more nearby buildings with associated components such as backup power supplies, redundant data communications, environmental controls, etc.) to form a datacenter, or may be arranged in other manners. Accordingly, in an embodiment, server 114 may be a datacenter in a distributed collection of datacenters.

In implementations, code deployer 116 is configured to deploy resources of resource set 122 on the cloud. For instance, code deployer 116 is provided with a set of program instructions 110 that defines the functionality of resources to be configured on the cloud. Based on the set of program instructions, code deployer 116 may generate configuration information 118 and create each resource for deployment on the cloud. In some examples, code deployer 116 comprises any number of pipelines, such as a build pipeline and a release pipeline for deploying resources on the cloud based on the set of program instructions. In one example, code deployer 116 comprises a continuous integration and continuous deployment (CI/CD pipeline).

Configuration information 118 is generated from program instructions 110 and identifies settings of each of the resources in resource set 122, where such settings define the functionality of various aspects of each resource. In some examples, configuration information 118 comprises an Infrastructure as Code (IaC) file that contains information to set up each resource of resource set 122 as a software-based infrastructure component. Configuration information 118 may be stored in any suitable format and/or language. In examples, configuration information 118 comprise any one or more files that is stored in the cloud and/or accessible in a limited manner. For example, configuration information 118 may be protected from normal or routine access by individuals in order to prevent alteration thereof. In some implementations, configuration information includes versioning information that indicates a version number, date, etc. associated therewith.

Attack path identification system 120 is configured to identify an attack path for any resource of resource set 122. An attack path is a representation of one or more events associated with an entity or set of entities in a computing environment during an exploitation of a security vulnerability by a malicious actor. In implementations, the attack path comprises a visual representation, such as a map, that identifies the events and computing system entities. In examples, an event includes any activity to advance an attack against a computing system entity, such as a login attempt (e.g., an unauthorized login to access a resource), an access of a computing system resource (e.g., access of sensitive data in a computing system), alteration of a component of a computing system (e.g., modifying a configuration or security policy to advance an attack), a traffic interception event (e.g., a man-in-the-middle in which network traffic between an endpoint and an organization is intercepted), a code injection event (e.g., malicious code inserted a web-based form field), network traffic flooding events (e.g., communications intended to exceed the capacity of a computing component), and other malicious communications relating to a computing system entity.

In examples, a computing system entity identified in an attack path includes any physical or virtual entity of a computing environment that is accessed and/or breached during exploitation of a vulnerability. Examples of computing system entities include, but are not limited to, a network component (e.g., routers, switches, etc.), a particular network port or ports that are accessed during an exploit, a computing device (e.g., servers, user computing devices, edge devices, etc.), storage resources (e.g., storage devices that may contain sensitive data), an application (e.g., operating systems, database applications, etc.), a user identity (e.g., user credentials, user account, etc.) exploited during an attack, a user role or user privilege exploited during an attack, and any other entity of a computing system (e.g., one of the resources of resource set 122) that is targeted during an attack.

In implementations, attack path identification system 120 identifies such an attack path based at least on a vulnerability identified from program instructions 110, configuration information 118, and/or telemetry information associated with the resource. As will be described in greater detail below, attack path identification system 120 may map program instructions 110 to one or more resources of resource set 110, thereby indicating where program instructions 110 are implemented in the cloud. Based on such information (in addition to other signals), attack path identification system 120 may identify potential breach pathways that may be exploited by malicious actors. In response to identifying an attack path, attack path identification system 120 may perform a remediation action, such as preemptively blocking access to a resource, notifying an author of program instructions 110 associated with the resource, modifying a security policy, etc. In this manner, potential breaches of resources may be efficiently identified and addressed. Further details of the attack path identification system 120 will be described in greater detail below.

Implementations are not limited to the illustrative arrangement shown in FIG. 1. For instance, computing device 102, computing device 106, repository 108, server 114, and/or resources of resource set 122 not be separate or located remote from each other. In some examples, any one or more of computing device 102, computing device 106, repository 108, server 114, and/or resources of resource set 122 (or any subcomponents therein) may be located in or accessible via the same computing device or distributed across a plurality of devices. For instance, techniques described herein may be implemented in a single computing device. Furthermore, system 100 may comprise any number of other storage devices, networks, servers, and/or computing devices coupled in any manner.

Figure 2:
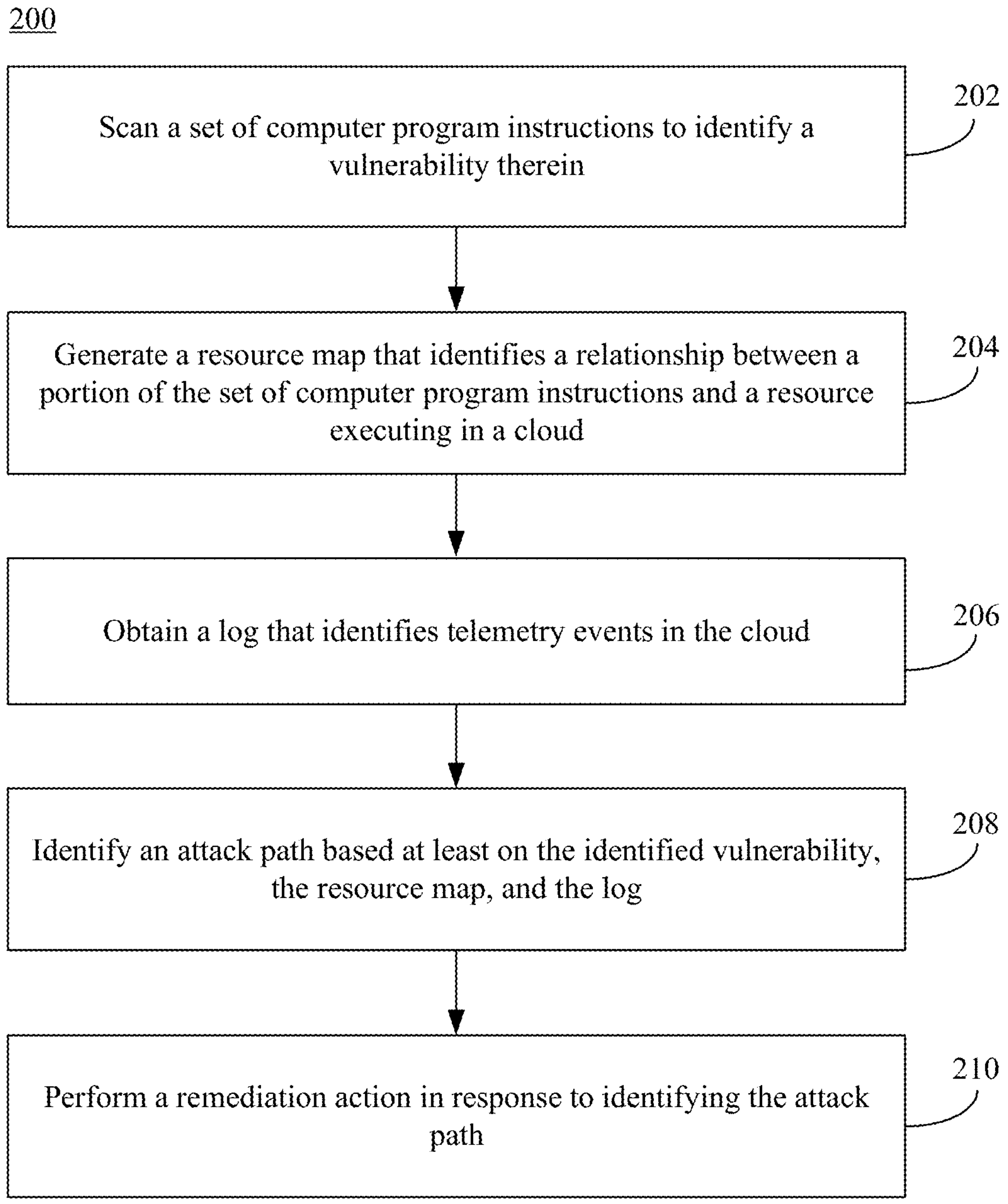
FIG. 2 shows a flowchart of a method for identifying an attack path, in accordance with an example embodiment.

Attack path identification system 120 may operate in various ways to identify an attack path in a computing environment. For instance, attack path identification system 120 may operate according to FIG. 2. FIG. 2 shows a flowchart 200 of a method for identifying an attack path, in accordance with an example embodiment. For illustrative purposes, flowchart 200 and attack path identification system 120 are described as follows with respect to FIG. 3. While example embodiments are described with respect to flowchart 200 and components of system 300, these examples are illustrative.

Figure 3:
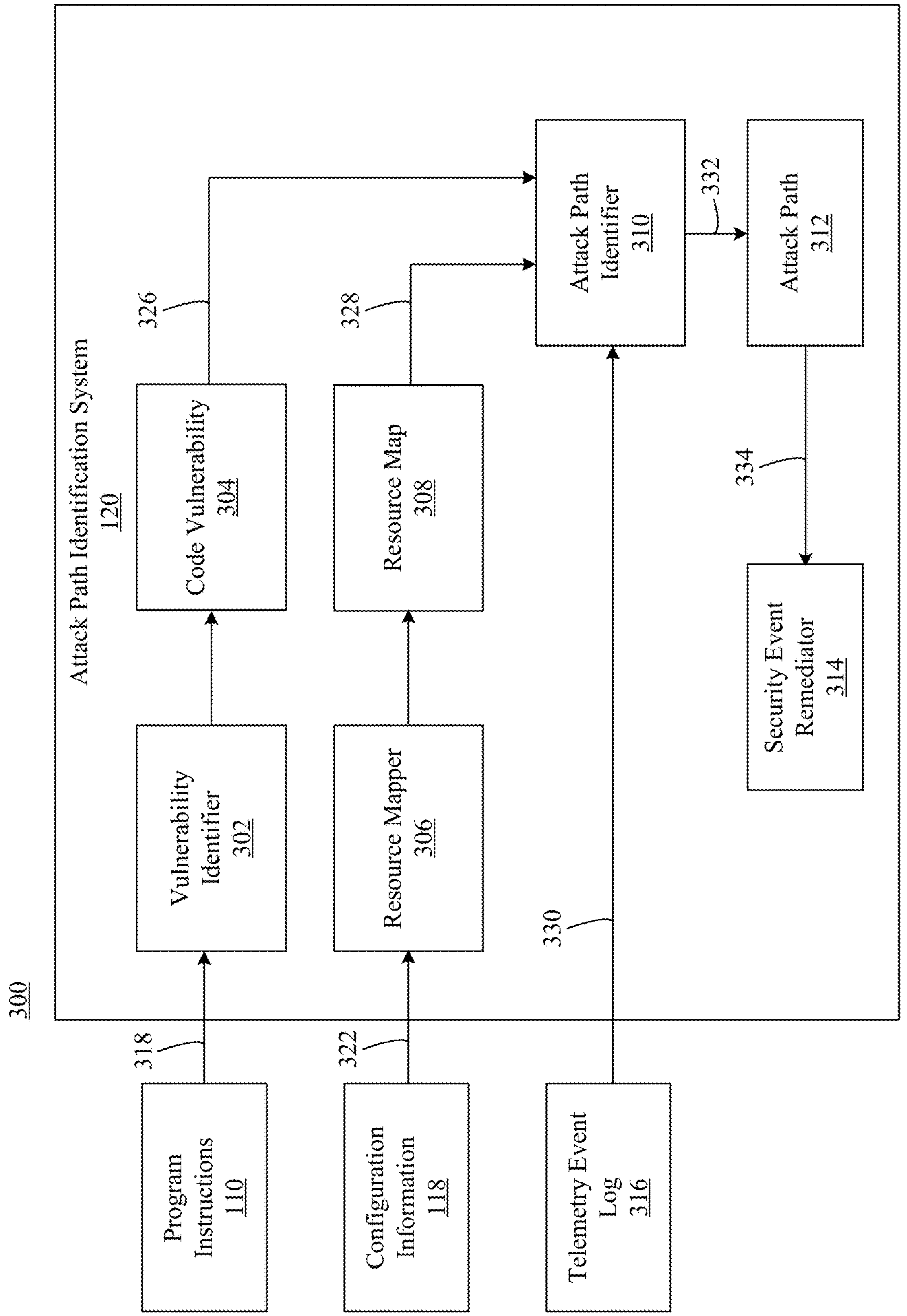
FIG. 3 shows a block diagram of a system for identifying an attack path, in accordance with an example embodiment.

FIG. 3 shows a block diagram of a system 300 for identifying an attack path, in accordance with an example embodiment. As shown in FIG. 3, system 300 includes an example implementation of program instructions 110, configuration information 118, and attack path identification system 120. System 300 also includes a telemetry event log 316. Attack path identification system 120 includes a vulnerability identifier 302, a code vulnerability 304, a resource mapper 306, a resource map 308, an attack path identifier 310, an attack path 312, and a security event remediator 314. Flowchart 200 and system 300 are described in further detail as follows.

Flowchart 200 begins with step 202. In step 202, a set of computer program instructions are scanned to identify a vulnerability therein. For instance, with reference to FIG. 3, vulnerability identifier 302 is configured to obtain 318 a set of program instructions 110 and scan the program instructions to identify code vulnerability 304 therein. In examples, code vulnerability 304 identified in program instructions 110 includes any portion of code that is identified as exploitable by a malicious actor and/or with a malicious intent. Such a vulnerability includes, for instance, a portion of code that may be used to gain unauthorized access to any of resources in resource set 122 or data accessible in other locations via such resources.

In example embodiments, vulnerability identifier 302 identifies code vulnerability 304 by scanning program instructions 110. For instance, vulnerability identifier 302 may scan program instructions 110 to identify known types of security vulnerabilities (e.g., based on a repository of known vulnerabilities). In one example, vulnerability identifier 302 may scan program instructions 110 to identify signatures or other markers indicative of code that may be exploited. In yet another example, vulnerability identifier 302 may scan program instructions 110 to identify information contained therein indicative of inadequate or faulty security measures, such as a code that exposes, or otherwise makes accessible, information that can be used to gain access to components of system 100 (e.g., a secret, encryption and/or decryption key, token, user login credentials, biometric information, etc.). In other examples, vulnerability identifier 302 is configured to scan program instructions 110 to identify code vulnerability 304 that comprises an open-source vulnerability, such as where program instructions 110 utilize one or more open-source packages that contain code known to be contain exploitable characteristics. In yet another example, code vulnerability 304 comprises code that maybe used for purposes of an injection attack, such as an SQL injection attack in which a malicious actor may access and/or alter data stored in a database or other repository. These examples are illustrative only, and vulnerability identifier 302 may identify other types of vulnerabilities contained therein that may be used to access components of system 100 in an unauthorized fashion.

In some examples, vulnerability identifier 302 is configured to perform a static analysis of code (e.g., scanning code to identify certain attributes that appear to comprise vulnerabilities). In other examples, vulnerability identifier 302 is configured to perform a dynamic analysis of code. For instance, during a dynamic analysis of code, vulnerability identifier 302 tests execution of the underlying program instructions and simulates different types of events (e.g., attacks) to identify vulnerabilities therein.

In some implementations, vulnerability identifier 302 is configured to scan configuration information generated based on the set of program instructions 110 to identify a vulnerability as described herein. In one example, the vulnerability may be identified before or at deployment of the resources generated therefrom. In another example, the vulnerability may be identified after deployment, such as where an actor intentionally or unintentionally modifies program instructions or a configuration file in a repository that creates vulnerability that did not exist prior to the modification. In such an example, vulnerability identifier 302 may be configured to scan the configuration file on multiple occasions (e.g., upon a change or access of the configuration file, periodically, etc.).

In step 204, a resource map is generated that identifies a relationship between a portion of the set of computer program instructions and a resource executing in a cloud. For instance, with reference to FIG. 3, resource mapper 306 is configured to generate resource map 308 that identifies a relationship between a portion of the set of program instructions 110 and one of resources of resource set 122 executing in the cloud. In example embodiments, resource mapper 306 may generate resource map 308 in response to obtaining 322 configuration information 118. As discussed herein, configuration information 118 comprises information (e.g., code, definitions, etc.) that indicates how each of the resources in resource set 122 are configured. Resource mapper 306 may determine, based on the configuration information, how each of the resources are configured on the cloud, including which portions of program instructions 110 may be used for each resource. In this manner, resource map 308 may indicate, for each resource of resource set 122, which portions of program instructions 110 are used for the resource. Stated differently, resource map 308 generated by resource mapper 306 may identify where different portions of program instructions 110 are implemented in the cloud (e.g., which resources implement such code).

In some examples, resource map 308 may comprises a tree, graph, or visual representation of the relationships between program instructions 110 and each of the resources of resource set 122 in system 100. For instances, resources may be represented by nodes, which are connected to one or more other resources and/or program instructions 110 that was used to generate the resources. An illustrative example of a resource map as discussed herein is described below with respect to FIG. 6.

In step 206, a log is obtained that identifies telemetry events in the cloud. For instance, with reference to FIG. 3, attack path identifier 310 is configured to obtain telemetry event log 316 that identifies telemetry events in the cloud (e.g., telemetry events with respect to one or more components of system 100). In implementations, telemetry event log 316 contains a history of communications to and/or from components of system 100. For example, telemetry event log 316 contains a history of events, such as logins login attempts, or other communications or accesses associated with a resource executing in the cloud. In another example, telemetry event log 316 contains a history of events, such as accesses or attempted accesses, associated with repository 108. In yet another example, telemetry event log 316 contains a history of accesses (or attempted accesses) of each resource in the cloud. In yet another example, event log 316 may contain a history of events associated with code deployer 116 (e.g., build and release pipelines).

In examples, telemetry event log 316 may contain information related to each communication involving a component of system 100 including but not limited to, an identification of the cloud component (e.g., a resource), an Internet Protocol (IP) address of an accessor, a geographic location of the accessor, an amount or type of data transfer, an identification of a file accessed, a user identity associated with an accessor, or any other information associated with the accessor and/or the cloud component accessed. In some implementations, telemetry event log 316 may identify, from log information contained therein, anomalous behavior, such as an anomalous login, a data exfiltration outside of normal behaviors (e.g., an exfiltration that exceeds a baseline amount), an anomalous access of any of resources of resource set 122, etc. In this manner, telemetry event log 316 may contain information that may be used to identify potentially abnormal events occurring with respect to various cloud resources of system 100.

In step 208, an attack path is identified based at least on the identified vulnerability, the resource map, and the log. For instance, with reference to FIG. 3, attack path identifier 310 is configured to identify 332 attack path 312 based at least on obtaining 326 code vulnerability 304, obtaining 328 resource map 308, and obtaining 330 telemetry event log 316. Since code vulnerability 304 indicates a vulnerability in program instructions 110 and resource map 308 identifies relationships between portions of program instructions 110 and resources executing in the cloud, attack path identifier 310 may determine which specific resources in the cloud are susceptible to different types of vulnerabilities. In addition, telemetry event log 316 identifies communications involving components of system 100, which may be leveraged by attack path identifier 310 to determine whether a vulnerability with respect to a given resource is being exploited.

As an example, code vulnerability 304 may indicate that program instructions 110 contain a risk of an SQL injection attack, and resource map 308 may map the portion of the code containing the SQL injection attack vulnerability to a particular cloud resource. Where attack path identifier 310 receives telemetry event log 316 that indicates abnormal behaviors originating from a web browser targeting an SQL server that is coupled to system 100, attack path identifier 310 may determine that the identified vulnerability (i.e., the SQL injection attack vulnerability) is being exploited or may be exploited with respect to the running resource in which the vulnerability is present. In this manner, attack path identifier 310 may identify attack path 312 that indicates that a malicious actor is exploiting or may exploit the vulnerability mapped to the given resource.

Thus, contrary to conventional techniques in which log information is typically analyzed in isolation, techniques described herein leverage telemetry event log 316 in connection with previously identified code vulnerabilities and a map of running resources in a cloud to identify an attack path. Such techniques allow for a streamlined identification of security events, as the identified attack path indicates the portions of each cloud resource that is at risk of a compromise based on an identified vulnerability.

In some implementations, attack path identifier 310 is configured to generate one or more datasets that may be queried based on code vulnerability 304, resource map 308, and telemetry event log 316. For instance, a dataset may contain telemetry event logs from each of the components across system 100, an identification of which resources contain which portions of program instructions 110, and an identification of vulnerabilities that are identified in program instructions 110. Since identified vulnerabilities may be mapped to a running resource in the cloud, queries may be executed with respect to those particular resources to determine whether telemetry event log 316 suggests that a vulnerability is being exploited or at risk of being exploited.

In example embodiments, attack path 312 identifies a type of security threat associated with the resource based at least on the identified vulnerability. For instance, attack path 312 may indicate how a resource may be attacked or exploited, as well as a blast radius for the attack. The blast radius defines the extent of such an attack, such as whether a single resource is at risk of being compromised, or if other components in system 100 are at risk of an attack (e.g., a data exfiltration of other resources in a lateral attack) based on the attack path and vulnerability. In this manner, insights (e.g., in the form of an attack path) may be provided to cloud security personnel based on program instructions, configuration, and telemetry information (e.g., alerts or events associated with anomaly detections).

In step 210, a remediation action is performed in response to identifying the attack path. For instance, with reference to FIG. 3, security event remediator 314 is configured to obtain 334 attack path 312 and determine a remediation action to perform in response to the identified attack path. In examples, the remediation action includes any action performed to mitigate an attack occurring on or predicted to occur along the identified attack path. For example, the remediation action may comprise implementation of a preventative measure such as implementing a change to eliminate the attack path, blocking an attack occurring on the attack path, or providing a notification identifying the attack path to an author of the set of program instructions 110. Examples of such a remediation action include, but are not limited to, blocking a port, modifying a security policy, changing permissions associated with a user account, disabling a user account, changing account credentials, disabling or preventing access of a resource of resource set 122, taking data (e.g., sensitive data) offline, etc.

While conventional techniques evaluate code and posture management separately, techniques disclosed herein connect those aspects (i.e., by connecting code with runtime cloud components or applications) that may enable security graphs to be enriched and extended, thereby improving overall cloud security. For instance, with other techniques, vulnerabilities in code are not connected to runtime resources that are affected such a vulnerability, or how anomalous telemetry may be connected to underlying programming code. With implementations described herein, not only are vulnerabilities identified in the code, but relevant insights such as how the vulnerability can be exploited, which resources are affected, and/or remediation actions that can be taken are provided to enhance overall security.

In some implementations, security event remediator 314 may perform one or more remediation actions automatically (e.g., without user input), such as where the risk of an attack is above a baseline and/or the type of exploit is severe. In other implementations, the remediation action comprises a notification to a security analyst that includes a recommended action that may be implemented to mitigate an attack along the attack path, such that the security analyst may implement the recommended action with minimal input. In yet other implementations, the remediation action includes a notification to an author of program instructions 110 (or a portion of the program instructions in which the vulnerability associated with the attack path is present) identifying code vulnerability 304, the affected resource, the attack path, etc., such that the author may revise program instructions 110 to remove the code vulnerability and/or prevent use thereof in future program instructions. In yet other implementations, the remediation action may comprise a notification to code authoring UI 104 that notifies other authors of the code vulnerability and/or attack path. In yet another implementation, code authoring UI 104 is configured to automatically prevent implementation of the code vulnerability associated with the identified attack path, thereby preventing its use in future program instructions. These examples are illustrative only, and other remediations actions may be performed by security event remediator 314 to mitigate attacks along attack path 312.

In some further implementations, security event remediator 314 may be configured to learn from attacks identified herein in order to prevent such attacks from occurring in the future (e.g., by hardening the cloud environment to mitigate such attacks). For instance, security event remediator 314 may implement a machine-learning (ML) model that is trained based on code that resulted in the generation of a security incident with respect to a cloud resource, configuration associated with the resource, and/or telemetry event log information associated therewith. Based on a trained ML model, other types of code vulnerabilities may be identified, such as by identifying code used in other program instructions that have similar features. In some implementations, use of such similar code may be prevented and/or a notification may be provided to a code author attempting to use such code to further enhance security.

Figure 4:
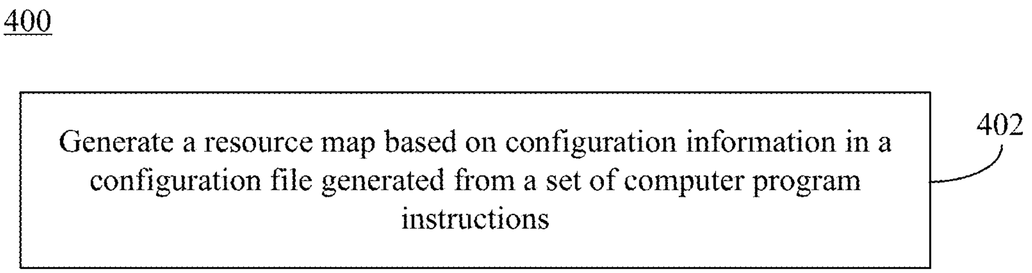
FIG. 4 shows a flowchart of a method for generating a resource map, in accordance with an example embodiment.

Turning now to FIG. 4, a flowchart 400 of a method for generating a resource map is shown, in accordance with an example embodiment. System 100 in FIG. 1 and/or system 300 in FIG. 3, e.g., via attack path identification system 120, operate according to flowchart 400. Further structural and operational examples will be apparent to persons skilled in the relevant art(s) based on the following descriptions.

Flowchart 400 begins with step 402. In step 402, a resource map is generated based on configuration information in a configuration file generated from the set of computer program instructions. For instance, with reference to FIG. 3, resource mapper 306 is configured to generate resource map 308 based on configuration information 118 that is in a configuration file. In examples, the configuration file is generated from the set of program instructions 110 (e.g., upon compiling the set of program instructions). In other examples, the configuration file is generated separately from the set of program instructions (e.g., written by a code author using a programming language). In embodiments, the configuration information is used to configure or set up each of the resources in resource set 122. The configuration file containing such configuration may comprise an IaC file, and/or may be deployed with versioning information. In some implementations, the configuration file may be stored in a repository (e.g., repository 108), may be stored in connection with a particular resource, or stored elsewhere in the cloud. Any number of configuration files may be present, and implementations are not limited to only a single configuration file associated with resource set 122.

Figure 5:
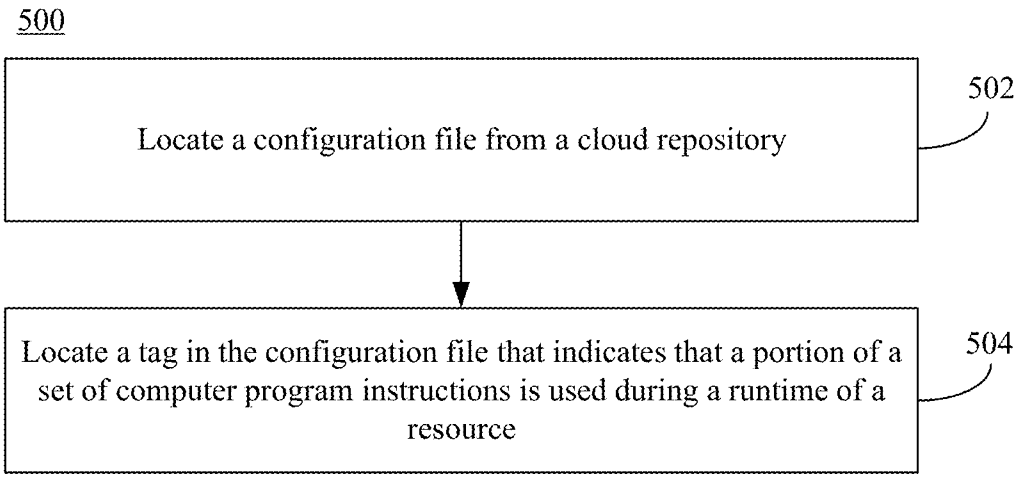
FIG. 5 shows a flowchart of a method for mapping resources based on a tag present in a configuration file, in accordance with an example embodiment.

Resource mapper 306 may map one or more portions of program instructions 110 to resources running in the cloud in various ways. For instance, FIG. 5 shows a flowchart 500 of a method for mapping resources based on a tag present in a configuration file, in accordance with an example embodiment. System 100 in FIG. 1 and/or system 300 in FIG. 3, e.g., via attack path identification system 120, operate according to flowchart 500. Further structural and operational examples will be apparent to persons skilled in the relevant art(s) based on the following descriptions.

Flowchart 500 begins with step 502. In step 502, a configuration file is located from a cloud repository. For instance, resource mapper 306 is configured to locate a configuration file containing confirmation information 118 from a cloud repository, which may include repository 108 or another cloud repository. In examples, resource mapper 306 may generate an in-memory clone of a cloud repository containing the configuration files, where the cloned repository may be crawled to identify and search through configuration files. In other examples, resource mapper 306 may identify and search through configuration files directly from the cloud repository in which they are stored.

Resource mapper 306 may identify configuration files may be identified from among other files in the repository in various ways. In one example, a configuration file can be identified from an indicator or template identified within the contents of the file (e.g., near a beginning of the file) that indicates that the file is an IaC file (or other configuration file).

In step 504, a tag is located in the configuration file that indicates that a portion of the set of computer program instructions is used during a runtime of a resource. For instance, with reference to FIG. 3, resource mapper 306 is configured to locate a tag in the configuration file that contains configuration information 118 that indicates that a portion of the set of program instructions 110 is used during a runtime of one the resources in resource set 122.

In some examples, resource mapper 306 may locate a tag (e.g., a unique identifier) that was previously inserted into the configuration file. The tag may indicate, for instance, a relationship between program instructions 110 (or a portion thereof) and a configuration of one or more resources in resource set 122. For instance, the tag may identify one or more templates contained in each configuration file, where each template is associated with a resource of resource set 122. Once each tag in each configuration file is identified, resource mapper 306 may store, in a data table, an identification of the configuration file, the repository from which the configuration file was located, and an identification of the resource associated with the configuration file (e.g., based on a tag contained therein). In this manner, resource mapper 306 may generate resource map 308 that connects different portions of program instructions 110 that was used to generate the configuration file to various resources in resource set 122.

Figure 6:
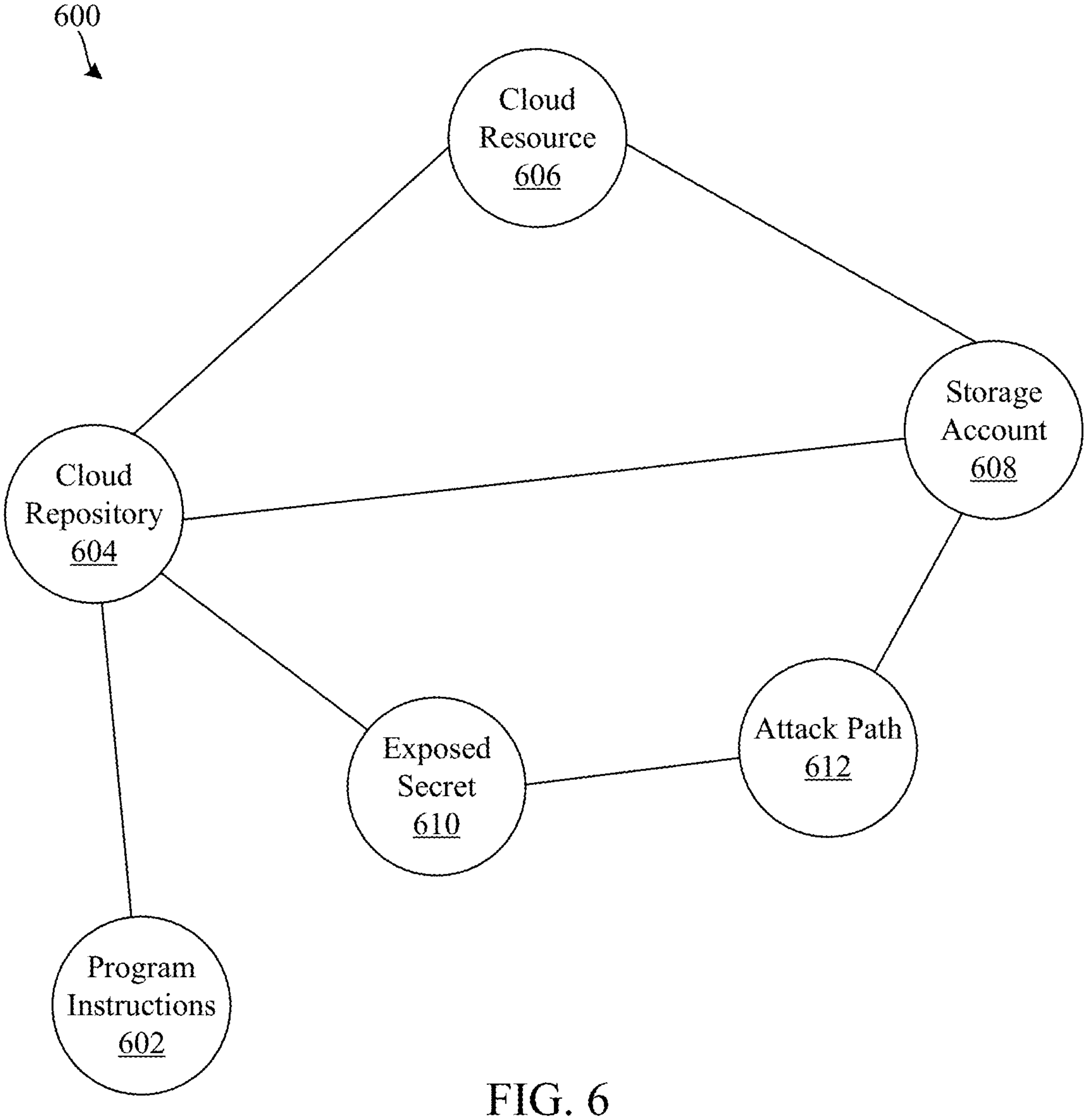
FIG. 6 shows an illustrative resource map of a cloud-based system implementing features of the disclosed techniques, in accordance with an example embodiment.

FIG. 6 shows an illustrative resource map 600 of a cloud-based system implementing features of the disclosed techniques, in accordance with an example embodiment. In FIG. 6, resource map 600 includes program instructions 602, a cloud repository 604, a cloud resource 606, a storage account 608, an exposed secret 610, and an attack path 612. In an example, program instructions 602 is an example implementation of program instructions 110, cloud repository 604 is an example implementation of repository 108, cloud resource 606 and storage account 608 are example implementations of resources of resource set 122, and attack path 612 is an example implementation of attack path 312.

In accordance with disclosed techniques, program instructions 602 may be written in any suitable code (e.g., source code) and compiled. Program instructions 602 may be stored in a cloud repository 604, along with configuration files generated therefrom that include configuration information for cloud resources. Cloud resource 606 and storage account 608 are both examples of resources that may be generated based on program instructions 602 and associated configuration information. In other words, the program instructions and configuration information collectively generated or instantiated the cloud resources illustrated in FIG. 6. These cloud resources are illustrative only, and any number and/or arrangement of cloud resources is contemplated herein.

Based on the mapping performed by resource mapper 306, a resource map as shown in FIG. 6 may be generated that maps code used to generate resources to each of those generated resources. For instance, resource map 600 indicates that cloud resource 606 and storage account 608 are both connected to cloud repository 604, indicating that the code contained in cloud repository 604 was used to generate cloud resource 606 and storage account 608. Connections in this manner may be provided for each resource shown therein, and each repository (and/or set of program instructions stored therein) from which the resource was generated. In this manner, the resource map shown in FIG. 6 may map various cloud resources to code that was used to generate those cloud resources.

Program instructions 602 stored in cloud repository 604 may be scanned to identify one or more vulnerabilities therein. As shown in FIG. 6, exposed secret 610 is an example of such a vulnerability identified from scanning (e.g., by vulnerability identifier 302) the set of program instructions 602. The exposed secret includes, for instance, any data that allows an actor to access any cloud resource shown in FIG. 6 (or any other information accessible therefrom), such as data that comprises encryption or decryption information, login credentials, a token, etc.

Attack path identifier 310 may obtain telemetry event log 316 that indicates, among other things, information associated with an anomalous login occurring or having occurred with respect to storage account 608. Based on such information, attack path identifier 310 determines that exposed secret 610 and the anomalous login are related (i.e., a malicious actor may be using the exposed secret to access information in a storage account), and therefore determine that attack path 612 exists that connects the exposed secret in the code to a resource generated by that code.

III. Example Computer System Implementation

Embodiments described herein may be implemented in hardware, or hardware combined with software and/or firmware. For example, embodiments described herein may be implemented as computer program code/instructions configured to be executed in one or more processors and stored in a computer readable storage medium. Alternatively, embodiments described herein may be implemented as hardware logic/electrical circuitry As noted herein, the embodiments described, including but not limited to, system 100 in FIG. 1 and system 300 in FIG. 3, along with any components and/or subcomponents thereof, as well any operations and portions of flowcharts/flow diagrams described herein and/or further examples described herein, may be implemented in hardware, or hardware with any combination of software and/or firmware, including being implemented as computer program code configured to be executed in one or more processors and stored in a computer readable storage medium, or being implemented as hardware logic/electrical circuitry, such as being implemented together in a system-on-chip (SoC), a field programmable gate array (FPGA), an application specific integrated circuit (ASIC), a trusted platform module (TPM), and/or the like. A SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Embodiments described herein may be implemented in one or more computing devices similar to a mobile system and/or a computing device in stationary or mobile computer embodiments, including one or more features of mobile systems and/or computing devices described herein, as well as alternative features. The descriptions of computing devices provided herein are provided for purposes of illustration, and are not intended to be limiting. Embodiments may be implemented in further types of computer systems, as would be known to persons skilled in the relevant art(s).

Figure 7:
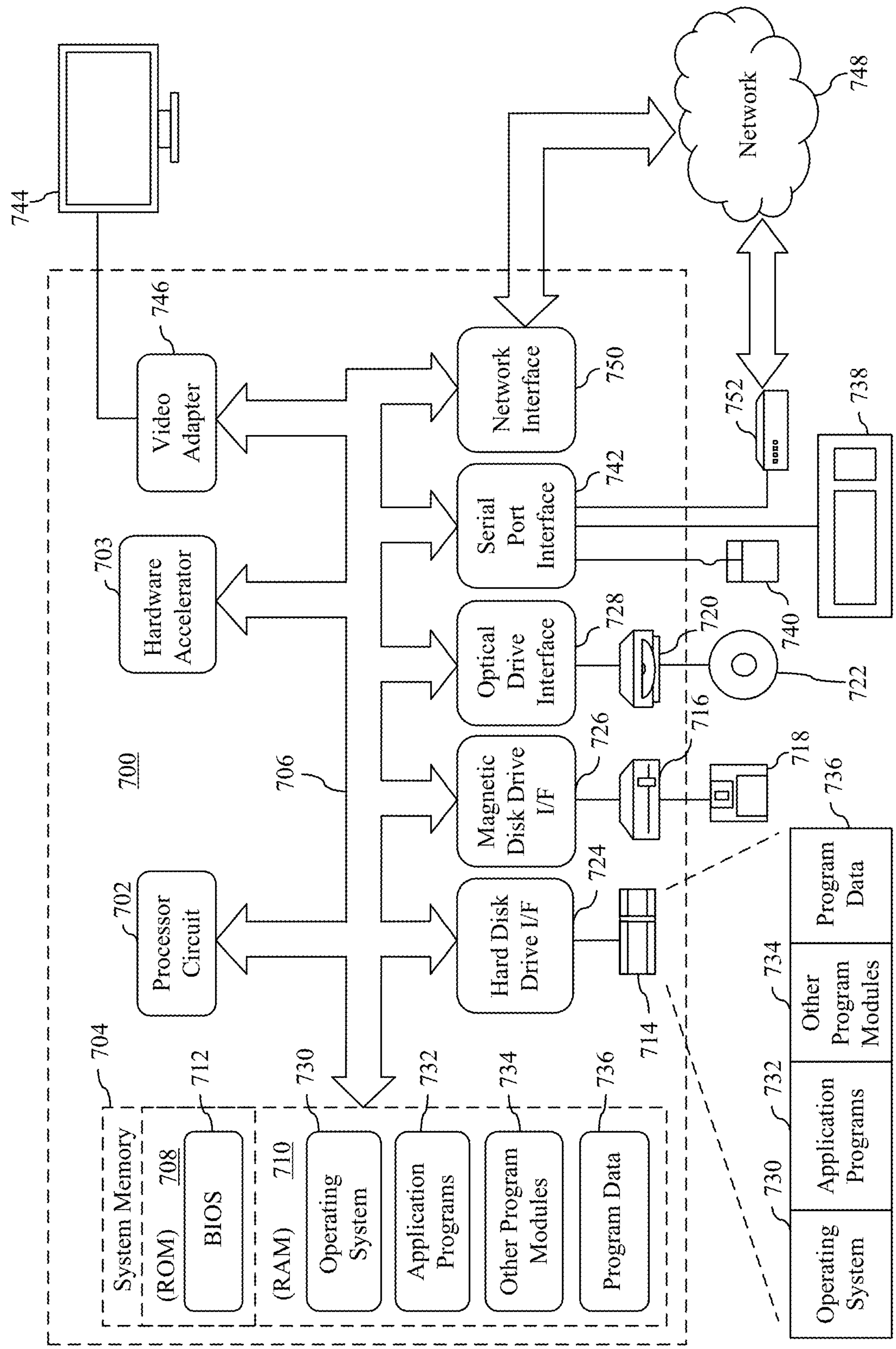
FIG. 7 is a block diagram of an example processor-based computer system that may be used to implement various embodiments.

FIG. 7 depicts an exemplary implementation of a computing device 700 in which embodiments may be implemented. For example, embodiments described herein may be implemented in one or more computing devices or systems similar to computing device 700, or multiple instances of computing device 700, in stationary or mobile computer embodiments, including one or more features of computing device 700 and/or alternative features. The description of computing device 700 provided herein is provided for purposes of illustration, and is not intended to be limiting. Embodiments may be implemented in further types of computer systems, servers, and/or clusters, etc., as would be known to persons skilled in the relevant art(s).

As shown in FIG. 7, computing device 700 includes one or more processors, referred to as processor circuit 702, a hardware accelerator 703, a system memory 704, and a bus 706 that couples various system components including system memory 704 to processor circuit 702 and hardware accelerator 703. Processor circuit 702 and/or hardware accelerator 703 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random-access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMS, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing embodiments described herein, such as but not limited to, system 100 in FIG. 1 and system 300 in FIG. 3, along with any components and/or subcomponents thereof, as well as the flowcharts/flow diagrams described herein, including portions thereof, and/or further examples described herein.

A user may enter commands and information into computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media. Such computer-readable storage media are distinguished from and non-overlapping with propagating signals and communication media (do not include propagating signals and communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 742, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A system for identifying a resource attack path is disclosed herein. The system includes: at least one processor circuit; and at least one memory that stores program code configured to be executed by the at least one processor circuit, the program code comprising: a vulnerability identifier configured to scan a set of computer program instructions to identify a vulnerability therein; a resource mapper configured to generate a resource map that identifies a relationship between a portion of the set of computer program instructions and a resource executing in a cloud; an attack path identifier configured to: obtain a log that identifies telemetry events in the cloud, and identify an attack path based at least on the identified vulnerability, the resource map, and the log; and a security event remediator configured to perform a remediation action in response to the identifying the attack path.

In one implementation of the foregoing system, the resource mapper is configured to generate the resource map based on configuration information in a configuration file generated from the set of computer program instructions.

In another implementation of the foregoing system, the configuration file is stored in a cloud repository.

In another implementation of the foregoing system, the log comprises one of a telemetry log identifying events in a repository, a telemetry log identifying events associated with the resource executing in the cloud, or a telemetry log associated with a release pipeline associated with deployment of the resource.

In another implementation of the foregoing system, the attack path identifies a type of security threat associated with the resource based at least on the identified vulnerability.

In another implementation of the foregoing system, the resource mapper is configured to generate the resource map by locating the configuration file from a cloud repository; and locating a tag in the configuration file that indicates that the portion of the set of computer program instructions is used during a runtime of the resource.

In another implementation of the foregoing system, the remediation action comprises at least one of: implementing a change to eliminate the attack path; blocking an attack occurring on the attack path; or providing a notification identifying the attack path to an author of the set of computer program instructions.

A method for identifying a resource attack path is disclosed herein. The method includes: comprising: scanning a set of computer program instructions to identify a vulnerability therein; generating a resource map that identifies a relationship between a portion of the set of computer program instructions and a resource executing in a cloud; obtaining a log that identifies telemetry events in the cloud; identifying an attack path based at least on the identified vulnerability, the resource map, and the log; and performing a remediation action in response to the identifying the attack path.

In one implementation of the foregoing method, the generating the resource map comprises generating the resource map based on configuration information in a configuration file generated from the set of computer program instructions.

In another implementation of the foregoing method, the configuration file is stored in a cloud repository.

In another implementation of the foregoing method, the log comprises one of a telemetry log identifying events in a repository, a telemetry log identifying events associated with the resource executing in the cloud, or a telemetry log associated with a release pipeline associated with deployment of the resource.

In another implementation of the foregoing method, the attack path identifies a type of security threat associated with the resource based at least on the identified vulnerability.

In another implementation of the foregoing method, the generating the resource map comprises locating the configuration file from a cloud repository; and locating a tag in the configuration file that indicates that the portion of the set of computer program instructions is used during a runtime of the resource.

In another implementation of the foregoing method, the remediation action comprises at least one of: implementing a change to eliminate the attack path; blocking an attack occurring on the attack path; or providing a notification identifying the attack path to an author of the set of computer program instructions.

A computer-readable storage medium is disclosed herein. The computer-readable storage medium has computer program code recorded thereon that when executed by at least one processor causes the at least one processor to perform a method comprising: scanning a set of computer program instructions to identify a vulnerability therein; generating a resource map that identifies a relationship between a portion of the set of computer program instructions and a resource executing in a cloud; obtaining a log that identifies telemetry events in the cloud; identifying an attack path based at least on the identified vulnerability, the resource map, and the log; and performing a remediation action in response to the identifying the attack path.

In one implementation of the foregoing computer-readable storage medium, the generating the resource map comprises generating the resource map based on configuration information in a configuration file generated from the set of computer program instructions.

In another implementation of the foregoing computer-readable storage medium, the log comprises one of a telemetry log identifying events in a repository, a telemetry log identifying events associated with the resource executing in the cloud, or a telemetry log associated with a release pipeline associated with deployment of the resource.

In another implementation of the foregoing computer-readable storage medium, the attack path identifies a type of security threat associated with the resource based at least on the identified vulnerability.

In another implementation of the foregoing computer-readable storage medium, the generating the resource map comprises locating the configuration file from a cloud repository; and locating a tag in the configuration file that indicates that the portion of the set of computer program instructions is used during a runtime of the resource.

In another implementation of the foregoing computer-readable storage medium, the remediation action comprises at least one of: implementing a change to eliminate the attack path; blocking an attack occurring on the attack path; or providing a notification identifying the attack path to an author of the set of computer program instructions.

V. Conclusion

While various embodiments have been described above, it should be understood that they have been presented by way of example only, and not limitation. It will be understood by those skilled in the relevant art(s) that various changes in form and details may be made therein without departing from the spirit and scope of the described embodiments as defined in the appended claims. Accordingly, the breadth and scope of the present embodiments should not be limited by any of the above-described exemplary embodiments, but should be defined only in accordance with the following claims and their equivalents.

What is claimed is:

1. A system for identifying a resource attack path, comprising:
- a processor; and
- a memory device that stores program code structured to cause the processor to:
  - scan program instructions to identify a vulnerability therein;
  - identify, based on a template contained in configuration information associated with the program instructions, a relationship between a portion of the program instructions and a resource in a cloud;
  - identify an attack path based on the vulnerability and the relationship between the portion of the program instructions and the resource; and
  - perform a remediation action in response to the identifying the attack path.

2. The system of claim 1, wherein the configuration information comprises a configuration file generated from the program instructions.

3. The system of claim 2, wherein the configuration file is stored in a cloud repository.

4. The system of claim 1, wherein the program code is structured to cause the processor to identify the attack path based at least on telemetry events in the cloud.

5. The system of claim 1, wherein the template is identified by a tag in the configuration information.

6. The system of claim 1, wherein the attack path identifies a type of security threat associated with the resource based at least on the vulnerability.

7. The system of claim 1, wherein the remediation action comprises one of:

implementing a change to eliminate the attack path;

blocking an attack occurring on the attack path; or providing a notification identifying the attack path to an author of the program instructions.

8. A method for identifying a resource attack path, performed by at least a hardware processor, the method comprising:

scanning, by the hardware processor, program instructions to identify a vulnerability therein;

identifying, by the hardware processor and based on a template contained in configuration information associated with the program instructions, a relationship between a portion of the program instructions and a resource in a cloud;

identifying, by the hardware processor, an attack path based on the vulnerability and the relationship between the portion of the program instructions and the resource; and performing, by the hardware processor, a remediation action in response to the identifying the attack path.

9. The method of claim 8, wherein the configuration information comprises a configuration file generated from the program instructions.

10. The method of claim 9, wherein the configuration file is stored in a cloud repository.

11. The method of claim 8, wherein the identifying the attack path comprises identifying the attack path based at least on telemetry events in the cloud.

12. The method of claim 8, wherein the template is identified by a tag in the configuration information.

13. The method of claim 8, wherein the attack path identifies a type of security threat associated with the resource based at least on the vulnerability.

14. The method of claim 8, wherein the remediation action comprises one of:

implementing a change to eliminate the attack path;

blocking an attack occurring on the attack path; or providing a notification identifying the attack path to an author of the program instructions.

15. A computer-readable storage medium having computer program code recorded thereon that when executed by at least one hardware processor causes the at least one hardware processor to perform a method comprising:

scanning program instructions to identify a vulnerability therein;

identifying, based on a template contained in configuration information associated with the program instructions, a relationship between a portion of the program instructions and a resource in a cloud;

identifying an attack path based on the vulnerability and the relationship between the portion of the program instructions and the resource; and performing a remediation action in response to the identifying the attack path.

16. The computer-readable storage medium of claim 15, wherein the configuration information comprises a configuration file generated from the program instructions.

17. The computer-readable storage medium of claim 16, wherein the configuration file is stored in a cloud repository.

18. The computer-readable storage medium of claim 15, wherein the identifying the attack path comprises identifying the attack path based at least on telemetry events in the cloud.

19. The computer-readable storage medium of claim 15, wherein the template is identified by a tag in the configuration information.

20. The computer-readable storage medium of claim 15, wherein the remediation action comprises one of:

implementing a change to eliminate the attack path;

blocking an attack occurring on the attack path; or providing a notification identifying the attack path to an author of the program instructions.

* * * * *